(No Model.)
A. CHEZEM.
BRIDLE ATTACHMENT.
No. 444,048. Patented Jan. 6, 1891.
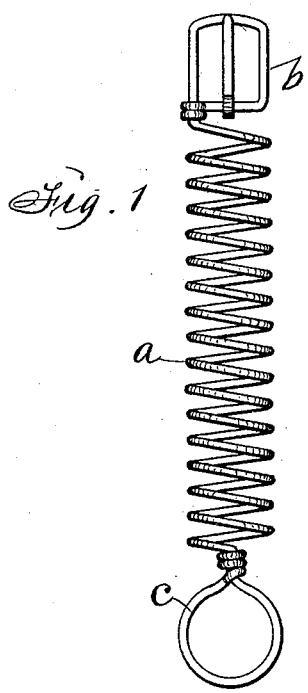
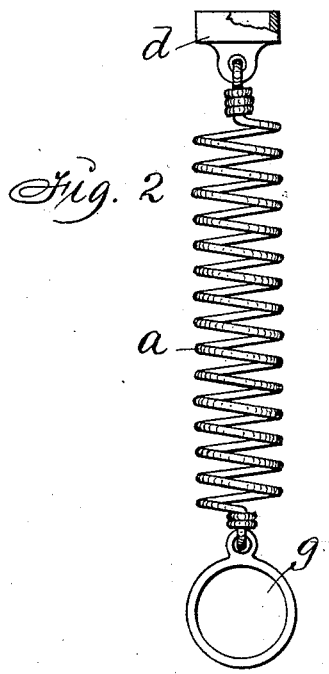
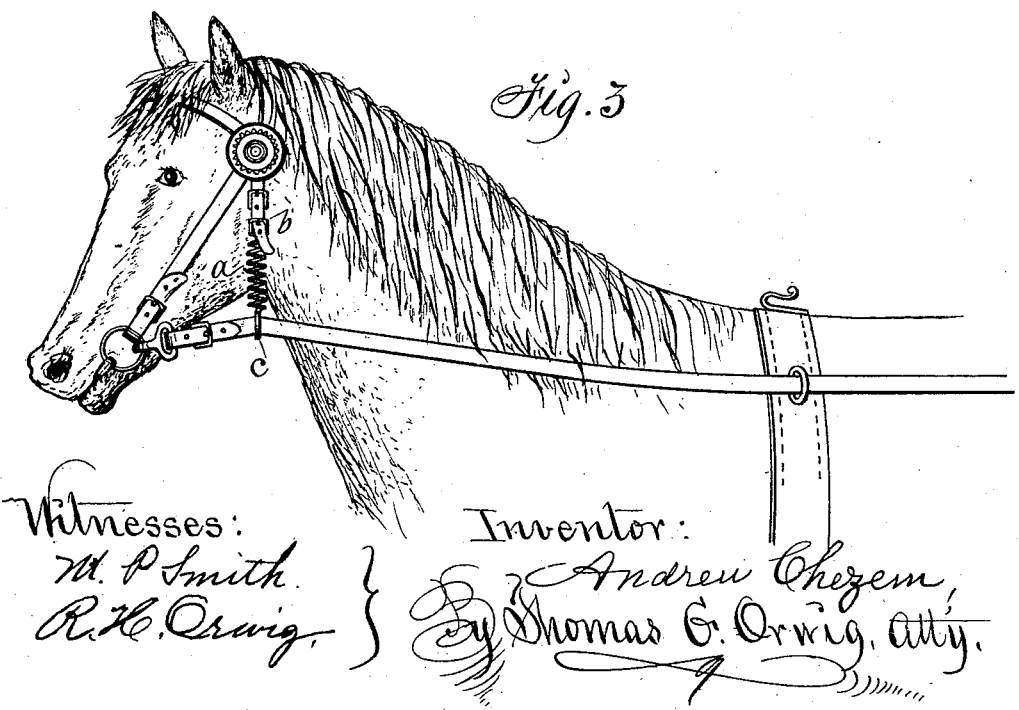
Witnesses: M. P. Smith, R. H. Orwig
Inventor: Andrew Chezem, By Thomas G. Orwig, Att'y.

UNITED STATES PATENT OFFICE.

ANDREW CHEZEM, OF SERGEANT BLUFF, IOWA, ASSIGNOR OF ONE-HALF TO ANDREW J. HUNTLEY, OF SAME PLACE.

BRIDLE ATTACHMENT.

SPECIFICATION forming part of Letters Patent No. 444,048, dated January 6, 1891.

Application filed September 17, 1889. Serial No. 324,261. (No model.)

*To all whom it may concern:*

Be it known that I, ANDREW CHEZEM, a citizen of the United States, residing at Sergeant Bluff, in the county of Woodbury and State of Iowa, have invented a new and useful Bridle Attachment, of which the following is a specification.

My object is to avoid the dangers and accidents incident to driving-reins drooping at the front ends of the shafts and catching on the shafts and annoying the horse and preventing the driver from controlling the horse by means of the driving-reins, and also to prevent injury and annoyance to a horse by sudden pulls or jerks upon the driving-reins or bridle-reins.

My invention consists in the construction and combination of a spring and a fastening device and a loop or ring with a bridle and a driving-rein, as hereinafter set forth, pointed out in my claims, and illustrated in the accompanying drawings, in which—

Figure 1 shows my device made complete in one piece and ready for application to a bridle. Fig. 2 shows the device composed of three distinct parts combined. Fig. 3 shows the complete invention applied as required for practical use.

*a* is a coiled-wire spring that may vary in size, as desired.

*b* is an integral buckle formed on its top end and adapted to be readily attached to the depending free end of the throat-latch of a bridle, as shown in Fig. 3.

C is an integral ring formed on the lower end of the spring and adapted in size to allow the driving-rein to be extended through before it is buckled to the bridle-bit.

In Fig. 2 a loop *d*, having a perforated ear projecting from its central portion, is fixed to the top end of the spring *a* by passing the end of the spring through the ear and then coiling the end upon a part of the spring, and a loop or ring *g*, having a perforated projection, is connected with the lower end of the coil *a* in the same manner. To fasten the loop *d* to a bridle, I slip the depending end of the throat-latch of the bridle through the loop and then buckle the throat-latch.

In practical use, when one of my devices is applied on each side of a bridle and a horse's head, as shown in Fig. 3, the reins passed through the loops or rings at the bottom of the springs will be held up, as required, to prevent them from getting under the ends of the shafts, and also, as required, to break the force of a sudden pull or jerk upon the reins or lines in the driver's hands by diverting and distributing part of the force to the spring, and thereby protecting the horse's mouth from chafing and laceration.

I am aware springs have been connected with the side straps of a bridle and bridle-bit to pull upward on the bit when in horse's mouth. I am also aware springs have been connected with the ends of a rein and a bridle-bit to protect an animal's mouth from any jerking force applied to the rein; but my device formed from a single piece of wire, and my manner of arranging and combining springs with the reins and the bit and bridle to be detachably connected with the throat-latch for the purpose of preventing the reins from sagging and catching the ends of shafts and also to protect a horse's mouth, is novel and greatly advantageous.

I am also aware that gag-runners have been combined with a bridle and a bridle-rein; but my manner of combining springs with the throat-latch of a bridle and driving-reins connected with the bridle-bit produces results not contemplated in connecting gag-runners with a bridle-rein.

I claim—

1. As an improved article of manufacture, a coil-spring having an integral buckle-frame at its top end, a tongue attached to the said frame, and an integral ring at its lower end, for the purposes stated.

2. The combination of a coil-spring having a buckle at its top end and a ring at its lower end, the throat-latch of a bridle, and a driving-rein, to operate in the manner set forth, for the purposes stated.

ANDREW CHEZEM.

Witnesses:
EWARD J. BAKER,
EMORY O. B. CHADWICK.